United States Patent [19]

Gunnarsson

[11] Patent Number: 5,392,049
[45] Date of Patent: Feb. 21, 1995

[54] DEVICE FOR POSITIONING A FIRST OBJECT RELATIVE TO A SECOND OBJECT

[76] Inventor: Staffan Gunnarsson, Svärdsliljevägen 62, S-165 77 Hässelby, Sweden

[21] Appl. No.: 934,663

[22] Filed: Jan. 21, 1993

[30] Foreign Application Priority Data

Jul. 24, 1990 [SE] Sweden .................................. 9002493
Jan. 22, 1991 [SE] Sweden .................................. 9100185

[51] Int. Cl.⁶ .......................... G01S 13/74; B67D 5/04
[52] U.S. Cl. ........................................ 342/42; 342/51; 340/572; 343/700 MS
[58] Field of Search ............ 342/51, 42; 343/700 MS; 340/572

[56] References Cited

U.S. PATENT DOCUMENTS

| | | | |
|---|---|---|---|
| 4,673,936 | 6/1987 | Kotoh | 342/51 |
| 4,728,955 | 3/1988 | Hane | 342/140 |
| 4,835,541 | 5/1989 | Johnson et al. | 343/700 MS X |

FOREIGN PATENT DOCUMENTS 0255095 2/1988 European Pat. Off. .
2527870 12/1983 France .

*Primary Examiner*—Gilberto Barrón, Jr.
*Attorney, Agent, or Firm*—Nies, Kurz, Bergert & Tamburro

[57] ABSTRACT

A device for positioning a first object relative to a second object, primarily for positioning an automatic fuelling device relative to vehicles. A transponder using a microstrip antenna design is small in dimension and gives accurate position indication by attachment to a back surface of a body which acts as a close reflection plane. The preferred embodiment of the device is a microstrip patch antenna where the ground plane is of similar size as the antenna element, and where the transponder is mounted on a car body rearward of the fuel filling point, to result in a radiation diagram that is created from the added direct signal from the antenna element and the reflected signal from the car body. A rounded profile of the transponder is a result of placement of its battery adjacent to the radiating element.

13 Claims, 3 Drawing Sheets

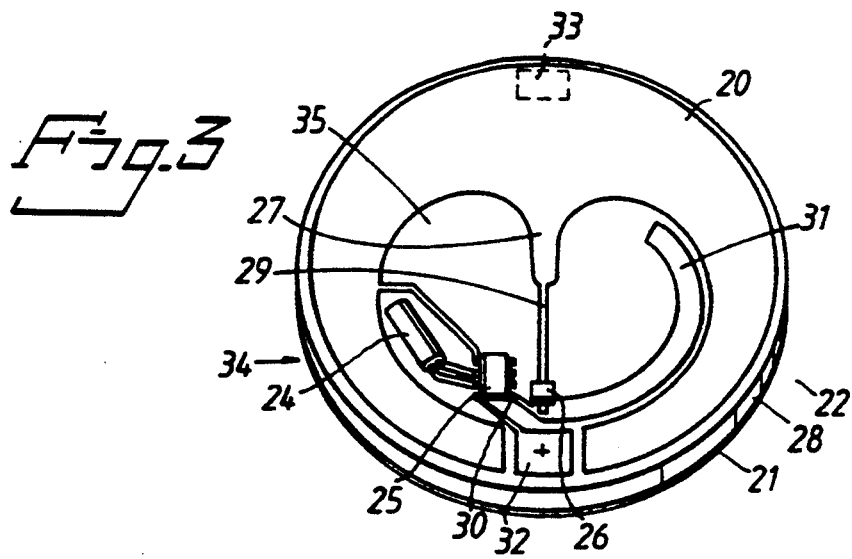
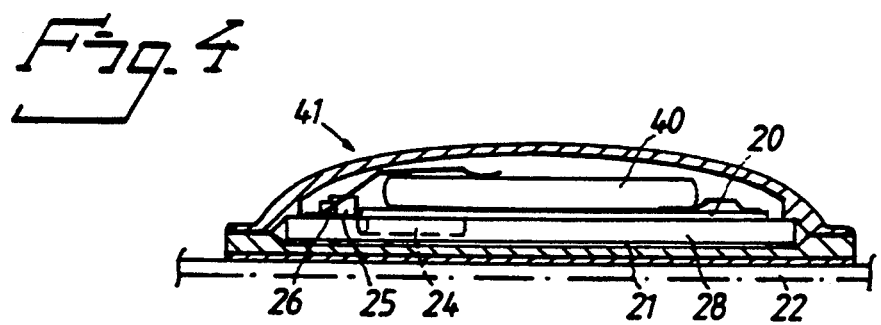
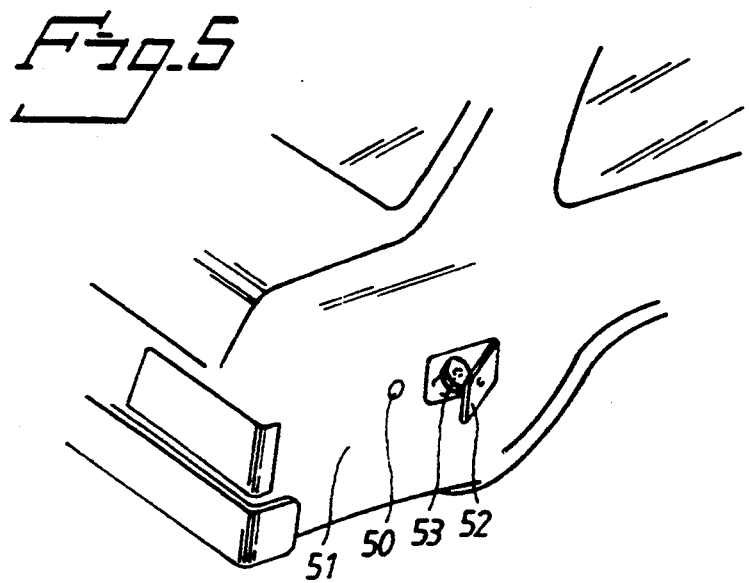

DEVICE FOR POSITIONING A FIRST OBJECT RELATIVE TO A SECOND OBJECT

The present invention relates to a device for positioning a first object relative to a second object, and primarily for positioning an automatic fuelling device relative to vehicles.

It is known to automatically fuel vehicles, where a fuelling device is mounted on the flexible arm of a robot.

Position finding can be made using optical technique, where for instance a vision system in the robot can determine the position of an indicator label that is mounted on the vehicle close to the filling point.

Optical systems however have problems in obtaining a suitable capture range, are fairly complex and thereby expensive and are also sensitive to environmental influences like dirt.

Another way of position finding is described in the swedish patent No 8403564-1, where a microwave sensor in the robotic head can make use of a microwave based transponder in the vehicle. The transponder then continously modulates signals from the sensor and reflects them back for, by phase and amplitude measurement, determining the location of the transponder in relation to the sensor.

A known method for automatic fuelling uses a microwave based transponder, with a directive antenna on a large ground plane, that is placed in a special tank door in the vehicle that has a leaded coupling to an adapter of a specific design for each vehicle type. The unit that is formed by transponder, tank door and adapter casing forms a kit that is needed for conversion of each vehicle for automatic fuelling, and substitutes the original plastic or metal tank door and tank cap.

A simple mounting of the transponder has not yet been possible because the size and weight of the unit has prevented a simple mounting on the vehicle side. In such systems vehicle conversion also becomes complicated, since the original tank door is difficult to remove on many vehicles. This method furthermore requires that a specific adapter is designed for each vehicle model which may lead to extra costs.

Public acceptance of the system is significantly related to the simplicity of conversion of vehicles for automatic fuelling and to the aesthetichal look of the converted vehicle. Since the transponders on a significant part of the vehicles are to be mounted by end users and not during vehicle manufacture, it is strongly preferred that its dimensions are compact It is also of value that the weight is low, since one simple mounting is on the vehicle surface, attaching the transponder to the vehicle with an adhesive.

It is also of importance that the system cost stays in good relation with the benefits of automatic fuelling.

Choosing higher microwave frequencies would make it possible to make the antenna element of the transponder smaller and lighter, bat then other problems would arise like decreased antenna efficiency, size limitations of other components such as the power source, increased component cost, difficulties with international frequency regulations and increased sensitivity to environmental factors like waterfilm and dirt on the transponder and the sensor.

A problem that may occur in systems where the transponder is mounted in the tank door is that small vehicle movements may result in failed docking between robot and vehicle. This may be because of suspension movements when a person enters or leaves the vehicle, or because of uncontrolled rolling of non-braked vehicles. Such systems have no possibility to give continous position information for compensation of the movement as soon as the position-indicator equipped tank door is opened. This problem is however smaller on heavy vehicles like buses and lorries.

A major problem with presently known transponders is that they are not small enough to be easy to adapt to vehicles. An object of the present invention is to greatly reduce the size of the transponders.

Another object of the invention is to provide a system that makes vehicle conversion simple, and where position indicating accuracy, weight and cost of the transponder have been optimized.

A further object is to make the physical appearance of the transponder as attractive as possible, and to make it resistant to wear, e.g. from automatic car washers.

Still another object is to make continous position sensing possible throughout the complete fuelling sequence.

The present invention relates to a device primarily related for robotic fuelling of vehicles, where the filling point is located by a position sensing system comprising a sensor comprising a transmitter and receiver unit in the robotic head and a transponder on the vehicle, which transponder operates at a frequency in the microwave range and which transponder operates to position said robotic head, and is characterized in that, the transponder includes an antenna element, that via a dielectric material is arranged with a ground plane, which antenna element is made in microstrip technique, which ground plane is of similar size as the antenna element and in that the transponder is arranged to cooperate with a reflector plane located behind the transponder in order to obtain an antenna radiating diagram that is directed perpendicular cut from the transponder on the opposite side of said reflecting surface, and that the transponder has a power source and/or any electronic element, placed inside the circumference of its antenna element at either side of the unit.

By making the antenna in the described way, where it is arranged to cooperate with a larger reflector plane located behind the antenna, the transponder can be made significantly smaller than known transponders in spite of that the same frequency range is used as the one currently used for the present application.

According to a prefered embodiment of the invention the microstrip antenna element is a patch antenna element 20 that via a dielectric material 28 is arranged with a ground plane 21 with a diametric extension of less than 1.7 times, and more than 0.6 times that of the antenna element, and where the reflection of the back lobe thereby created is reflected by a surface 22 behind the transponder and added to the direct signal from the antenna to form a radiating diagram directed perpendicular to the surface of the antenna element.

According to an alternative embodiment the microstrip antenna element comprises at least one dipole antenna element 60;70, of a folded type arranged with a ground plane 21 with a diametric extension of less than 1.7 times, and more than 0.6 times that of the antenna element, and where the reflection of the back lobe thereby created is reflected by a surface 22 behind the transponder and added to the direct signal from the antenna element to form a radiating diagram directed perpendicular to the surface of the antenna element.

By diametric extension is meant the diameter of a circle that encloses the ground plane 21 and respectively the antenna element 20;60;70.

The accuracy problem can be solved by mounting the transponder directly on a well defined reflecting surface which is large compared to the antenna element diameter, e g the side surface of the vehicle rearward of the tank door, and using an antenna design that makes use of this reflecting surface in a defined way.

The dimension and weight problems have been solved by using a microstrip antenna with small dimensions in relation to its operating frequency. A preferred embodiment of the antenna comprises a conventional patch antenna, where the surface of the ground plane ham been reduced to similar size as the patch, instead of, as in a normal round or rectangular patch antenna, to be typically four times the area of the antenna patch or more. Any of the patch and groundplane elements therefore work symmetrically to each other, giving a free space radiation diagram that is the same in the front as well as in the back directions. When mounted with either side close to a reflection plane such as the car body, a well defined radiation diagram is achieved due to vectorial addition of the direct and reflected signals.

An alternative embodiment of the antenna uses a microstrip dipole that when mounted close to the vehicle gives a directed diagram for the position indication to the sensor in the fuelling robot. This antenna may be of the folded dipole type, and can, if increased antenna gain is needed, be built in an array of e g two dipoles on the same microstrip surface.

The dimension and weight problem is further solved by placing a power source, typically a battery, on the antenna (or groundplane) inside the outer edges, thereby eliminating any need of special space for the battery. Since the battery size is smaller than the antenna, radiation from the antenna is hardly influenced.

The unit may also be powered externally via the microwaves transmitted towards the transponder, should this be of interest.

The cost problem has been solved in that no special tank door has to be used, in that the smaller dimensions of the transponder in itself gives lower material cost and also because the cost of assembly on the vehicle is made simple.

Mounting the transponder on vehicles that are not prepared for automatic fuelling from the factory can be done by placing the transponder on a suggested location on the vehicle side and fixing it to the vehicle with an adhesive. It is also possible to mount it in a metal cup in a hole in the vehicle side, on the outside of the tank door, or on the inside of the tank door, should the tank door be in a microwave transparent material.

Mounting on vehicles that have been prepared for automatic fuelling by a special cavity or recess near the filling point in the car body can be done by assembling the transponder into this cavity or recess in such a way that the vehicle surface after assembly remains flat. This can be done in many ways, e.g. by fixing the transponder in position with a transponder cap.

The physical appearance problem and stress resistance problem is solved, apart from that the diameter of the unit is small by using an antenna according to the invention, in that the arrangement with the battery on the antenna also permits encapsulation in a low-profile rounded case that both is aestethically attractive and well withstands mechanical stress from e.g. automatic car wash machines or children's fingers when placed on the vehicle surface with the rounded side out.

The continous position sensing problem has been solved in that the transponder can be mounted in other locations, in relation to the tank door. On most vehicles, the tank door opens in direction to the front. By this arrangement, the sensor can stay in contact with the transponder throughout the docking procedure, and undesired tank door microwave reflections or hiding effects are prevented.

Still other objects and advantages of the invention will be apparent to those skilled in the art from the following description.

The invention will now be described in connection with exemplifying embodiments shown in the attached drawings, where FIG. 1 shows a block diagram of the transponder;

FIG. 3 shows an embodiment of a transponder according to the invention;

FIG. 4 shows the encapsulated transponder in a profile view;

FIG. 5 shows the transponder on a vehicle;

FIG. 5 shows an overview of a vehicle that can be automatically fuelled by means of a robot, through a filling point 53 behind the tank door 52, where a transponder 50 in a preferred embodiment is mounted on (or in) the side surface 51 of the vehicle, or possibly on (or behind) the original tank door 52 provided that a reflecting layer with a large extension compared to the transponder antenna is facing the back side of the transponder, thus preventing residue back lobe reflections in the cavity behind the tank door.

Figure 1:
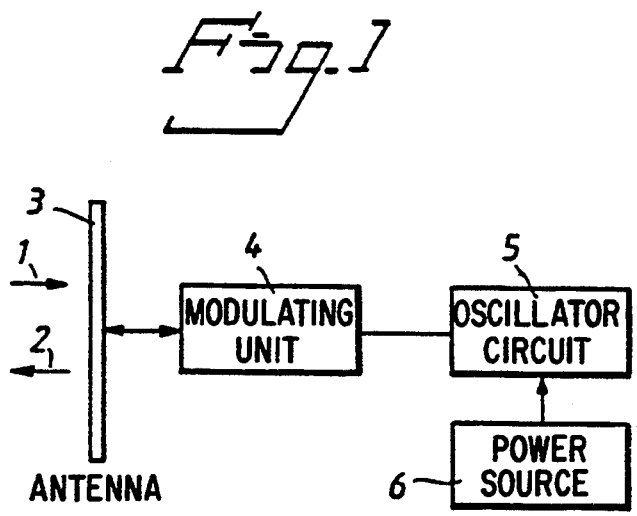

FIG. 1 shows a block diagram of a transponder that is based on the principle that an incoming microwave signal 1 is modified and reflected 2.

The antenna 3 receives a microwave frequency, e.g. at 2.45 GHz, from a transmitter/receiver unit in a position indication sensor, not shown on the figure, and transfers this signal to modulation circuits in the modulation unit 4. Using signals from the oscillator circuit 5, the modulation unit will add sidebands to the transponder received signal 1, and bring these back to the antenna where they are reradiated 2 into the space in front of the transponder so that the sensor can make the desired position measurement.

A power source 6 supplies the transponder with necessary energy.

Figure 2:
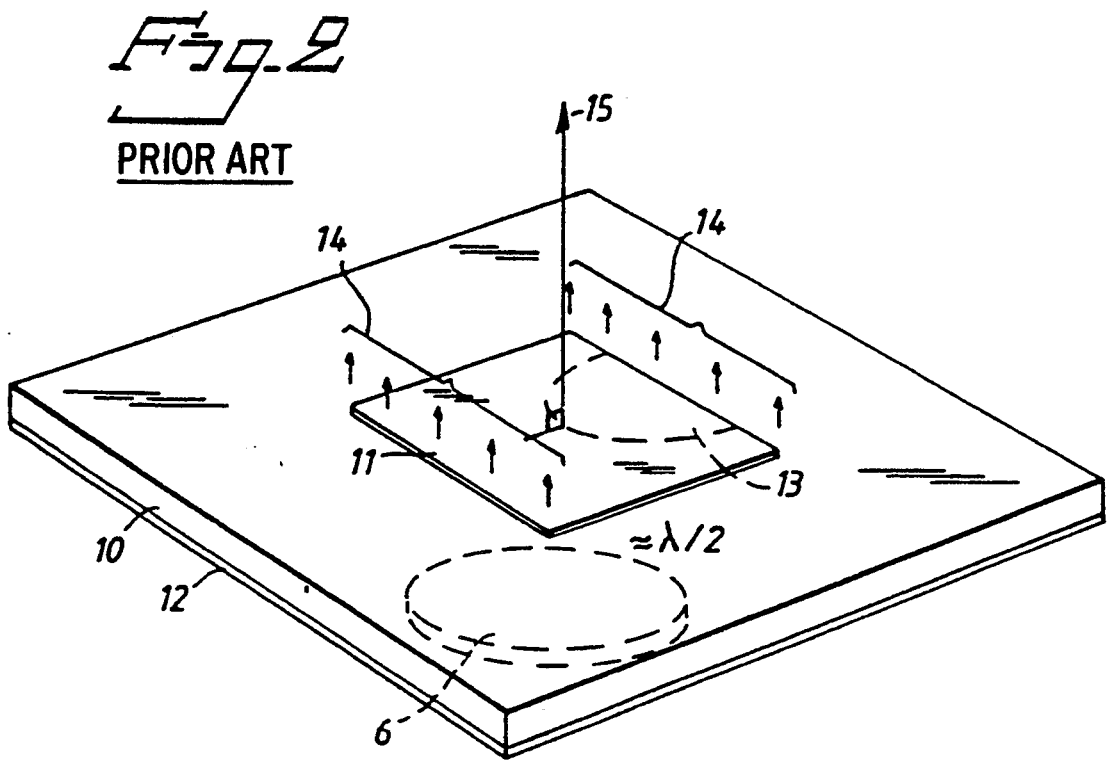
FIG. 2 shows a known transponder with a conventional microstrip patch antenna.

FIG. 2 shows a known conventional microstrip patch antenna, where a dielectric material 10 on one side has an antenna element 11 of metal while a ground plane 12 is placed on the opposite side of the antenna element.

If an electrical alternating voltage relative to the ground plane is applied in or in the vicinity of the area 13 of the antenna element, a standing wave will occur in the antenna element in such a way that radiation is made from the electrical field at the edges of the antenna element, indicated by the arrows 14, so that a wave is transferred in the normal direction 15. Reciprocally, an incoming wave will create an alternating voltage in area 13.

This is however only the case if the ground plane 12 is considerably larger than the antenna element 21, otherwise the antenna will radiate also in the opposite direction to 15.

FIG. 3 shows a transponder design where the antenna element 20 and the ground plane 21 have about equal size. This antenna type will, if placed in free space, radiate in a similar way both in the direction perpendicular from the antenna element and in the direction perpendicular from the ground plane. If the unit however, as in the invention, is placed near to a reflection plane 22, typically less than a tenth of a wavelength from, the wave that is radiated in the direction of the metal plane will be reflected there and add almost in phase to the earlier described radiation in direction from the antenna element 20.

This limited groundplane microstrip antenna will operate excellently when mounted close to a reflecting surface in opposition to a standard dipole, where the reflected signal would cancel the direct signal from the antenna element.

By making use of the reflected signal from a well defined surface such as the car body 51 or a mounting cavity, an extremely accurate position indication signal is possible without negative influence from undefined back lobe reflections.

In a microstrip patch antenna, the radiation comes from the edges of the antenna element and not from the inner parts of the antenna surface. This surface can therefore be used for other purposes, e.g. (as shown in FIG. 3), to mount the circuits 24, 25, 26 that are need to obtain an electrical modulation in the antenna feeding point 27 by influencing the point impedance in relation to the ground plane 21.

It is also possible to, without impeding the antenna function, place a power source such as a battery inside the radiating edges of the antenna element. This battery can for symmetrical reasons freely be placed on any side of the dielectric material 28, either as the power source 40 that is indicated in FIG. 4 or on the side that is directed towards the reflection surface 22. The transponder will give desired function no matter which of the surfaces 20 or 21 that are placed towards the reflection surface, and no matter of on which side the power source is placed.

A signal received by the antenna element 20 will give an electrical alternating field across the dielectric material 28 in relation to the ground plane 21 in the antenna feeding point 27, which is placed in or near an area corresponding to the area 13 in FIG. 2.

The received signal is fed via a conductor 29 to a diode 26, the impedance of which can be varied between different values depending on which voltage that is applied across its terminals. In the she embodiment there is an integrated circuit 25 which at its output 30 gives a control voltage to the diode 26 which influences its impedance. One side of the diode is from a microwave point of view short circuited to the groundplane by the open quarterwave conductor 31, and will consequently, depending on the voltage from the circuit 25, in a microwave sense more or less connect the point oscillator in the circuit 25.

The described impedance variation by the diode 26 will have as a consequence that a towards the antenna element 20 incoming wavefront will give a reflex where phase and amplitude will be influenced by the impedance in the diode 26.

If the integrated circuit 25 is giving a continuous, e.g., at 32 kHz, squarewave signal to the diode 26, there will be a 32 kHz modulation on to the incoming microwave frequency from the position sensor, and the reradiated signal from the transponder can now be used by the position sensor to determine the location of the transponder.

The connections 32 and 33 are for voltage supply to the transponder circuits from a power source, not shown in FIG. 3. Connection pad 32 has by space reasons been placed in an opening in the outer edge of the antenna element 20, but this makes no difference to the antenna function since the antenna has a current minima in this point.

A diode can be used as a rectifier for received microwave signals, where the rectified signal is used for powering the transponder in stead of, or as a complement to, the in the transponder included power source. It is possible to use the diode 26 for this purpose. The advantages of microwave powering are primarily that the unit can be made even smaller than with a battery, and also that the cost of the battery is eliminated.

In another embodiment of the transponder, not shown, the antenna element operates through the dielectric material toward a ground plane as earlier described, but the feeding point of the antenna element is via a through lead conductor in connection with the opposite side of the groundplane, on their own dielectric substrate, placed electronic and microstrip circuits.

In this second embodiment the quarterwave conductor acts towards the same groundplane as the antenna through this extra dielectric substrate that also carries the electronic components and interconnections.

FIG. 4 shows a cut-through projection of the transponder. The working principle is the same as earlier described, with a microstrip antenna element 20 and with a power source 40 mounted inside the outer edge of the antenna element. The shown assembly, where the power source is smaller than the antenna element, makes a rounded encapsulation exterior 41 possible.

Figure 6:
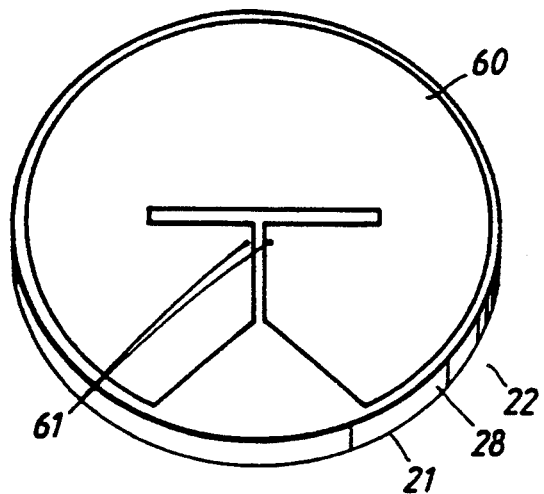
FIG. 6 shows an embodiment of a transponder using a single microstrip folded dipole antenna.

FIG. 6 shows an embodiment of the transponder where a microstrip folded dipole antenna is used. The microstrip folded dipole function is to some extent similar to that of the patch antenna in that it may be mounted close to a reflecting surface.

The dipole element is formed by a metal surface 60 that is attached to a carrier substrate 28, with a ground plane 21 on its opposite side, and where the assembly is mounted on a reflecting surface 22. The modulation of an incoming microwave signal from the transmitter/receiver unit to the transponder is made by known modulation components which are connected to the antenna element in its feeding points 61 in a similar way as earlier described.

Figure 7:
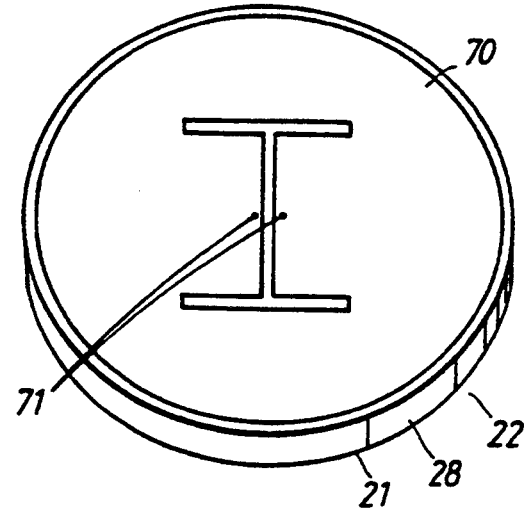
FIG. 7 shows an embodiment of a transponder using a folded dipole array

FIG. 7 shows an embodiment of the transponder where an array 70 of two microstrip folded dipoles, via a dielectric substrate 28, cooperates with a groundplane 21. The modulation signal is applied in the feeding points 71, and the assembly is mounted on a reflecting plane 22.

According to a prefered embodiment the microwave microstrip conductors 29,31 are mounted inside an opening 35 of the antenna element 20, where the microstrip conductors 29,31 are placed on the same side of a dielectric substrate 28 as the antenna element 20 and acting against the same ground plane 21 as the antenna element. This gives that the transponder including its components can be made small. Further there is no need for wiring through the dielectric substrate 28.

According to one embodiment of the invention the reflecting surface 22 forms a part of a vehicle side surface 51, or a tank door 52, or a reflective mounting device 90 on the inside of a microwave transparent tank door. Said mounting device has a diametric extension of at least 1.7 times the diameter of the antenna element 20, 60, 70. Alternatively the reflecting surface forms a part of a mounting cup 80 that is intended for assembling the transponder in a hole in the vehicle side 51 or in the tank door should it be in a reflective material.

Preferably the transponder 50 is mounted on the vehicle side 51 rear, below, above or forward of the tank door 52.

Alternatively the transponder is mounted on the outside of the tank door, where the tank door includes a reflecting surface with a diametric extension at least 1.7 times that of the antenna element.

The transponder can also be mounted behind the tank door should the tank door be in a microwave transparent material, for example a plastic material. Hereby a reflecting device 90 shall be arranged behind the transponder. Such reflecting device can for instance be an electrically conducting surface.

Figure 8:
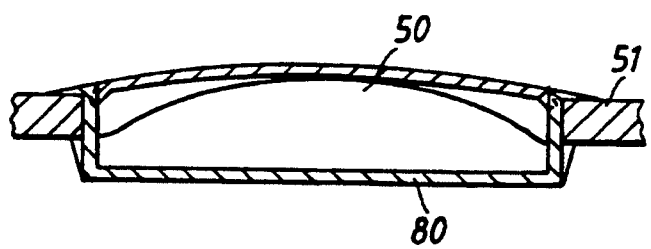
FIG. 8 shows the transponder mounted in a cup of reflecting material that has been inserted in a hole in the vehicle side.
Figure 9:
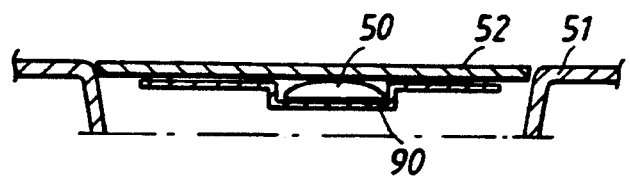
FIG. 9 shows the transponder mounted on the inside of a vehicle's microwave transparent tank door.

In FIG. 8 an embodiment is shown where the transponder is mounted in a mounting cup 80 of a reflective material that has been inserted in a hole or a recess in the vehicle side 51 or tank door.

The various features and advantages of the invention are thought to be clear from the foregoing description. However, various other features and advantages not specifically enumerated will undoubtedly occur to these versed in the art, as likewise will many variations and modifications of the preferred embodiments illustrated, all of which may be achieved without departing from the spirit and scope of the invention as defined by the following claims.

I claim:

1. A device for positioning a first object relative to a second object which includes a metal surface, where the first object has a robotic head and the second object is located by a position sensing system comprising: a sensor and a transponder; said sensor comprising a transmitter and receiver unit in the robotic head and said transponder (50) is located on the metal surface of said second object; said transponder operates at a frequency in the microwave range and is enabled to reradiate a signal received from said sensor, said transponder thereby operating to enable positioning of said robotic head relative to said second object, said transponder comprising a microstrip antenna element (20), (60), (70), a dielectric material plate (28) and a ground plane (21), said dielectric material plate having two sides and mounting said microstrip antenna on one of said sides and mounting said ground plane on the other of said sides; said ground plane (21) being of similar size as the microstrip antenna element and wherein the transponder is arranged to cooperate with said metal surface of said second object which thereby provides a reflector plane (22), located behind the transponder, to obtain an antenna radiating diagram that is directed perpendicular out from the transponder on the opposite side from said reflection plane; said transponder having a power source (40) and associated electronic elements, placed inside the perimeter of said microstrip antenna element (20), (60), (70) and on one side of the dielectric plate.

2. Device according to claim 1, wherein the metal reflecting surface (22) forms a part on the side of a vehicle and wherein said dielectric material plate has a diametric extension of at least 1.7 times the effective diameter of the microstrip antenna element (20), (60), (70).

3. A device according to claim 2 wherein said part on the side of a vehicle comprises: a fuel tank door.

4. A device according to claim 3, wherein said part on the side of a vehicle is a microwave transparent fuel tank door including a metal reflective device on the inner side of the door.

5. A device according to claim 2 wherein said part on the side of a vehicle comprises: a metal plate part with a hole therein; and a mounting cup with at least a metal base portion is used as a mounting for said transponder.

6. Device according to claim 1, wherein microwave microstrip conductors (29), (31) are mounted inside an opening (35) of the microstrip antenna element (20), where the microstrip conductors (29), (31) are placed on the same side of said dielectric plate (28) as the microstrip antenna element (20) and acting against the same ground plane (21) as the microstrip antenna element.

7. A device as defined in claim 1, wherein said first object is an automatic fueling device and said second object is a vehicle with a fueling point, said transponder being mounted on the vehicle adjacent said fueling point.

8. Device according to claim 7, wherein the vehicle has a tank door and the transponder (50) is mounted on the vehicle side (51) adjacent the tank door (52).

9. Device according to claim 8, wherein the transponder is mounted on the outside of the tank door, and wherein the tank door includes a metal reflecting surface with a diametric extension at least 1.6 times that of the antenna element.

10. Device according to claim 8, wherein the transponder is mounted behind the tank door, the tank door being made from a microwave transparent material, and a metal reflecting device (90) is arranged behind the tank door and behind the transponder.

11. Device according to claim 1, wherein the transponder powering is made by microwave energy, where a received microwave powering signal is rectified by at least one diode (26) to supply the electronic components with energy.

12. A device for positioning a first object relative to a second object which includes a metal surface, where the first object has a robotic head and the second object is located by a position sensing system comprising: a sensor and a transponder; said sensor comprising a transmitter and receiver unit in the robotic head and said transponder (50) is located on the metal surface of said second object; said transponder operates at a frequency in the microwave range and is enabled to reradiate a signal received from said sensor, said transponder thereby operating to enable positioning of said robotic head relative to said second object, said transponder comprising a microstrip antenna element (20), (60), (70), a dielectric material plate (28) and a ground plane (21), said dielectric material plate having two sides; said ground plane (21) being of similar size as the microstrip antenna element and wherein the transponder is arranged to cooperate with said metal surface of said second object which thereby provides a reflector plane (22), located behind the transponder, to obtain an antenna radiating diagram that is directed perpendicular out from the transponder on the opposite side from said reflection plane; said transponder having a power source (40) and associated electronic elements, placed inside the perimeter of said microstrip antenna element (20), (60), (70) and on one side of the dielectric plate; said microstrip antenna element being a patch antenna element, and the size of said ground plane (21) provides a diametric extension of less than 1.7 times, and more than 0.6 times that of the size of the antenna element, whereby the reflection of the back lobe thereby created is reflected by said metal surface of the second object located behind the transponder and is added to the direct signal from the microstrip antenna to form a radiating diagram directed perpendicular to the dielectric material plate and the microstrip antenna element.

13. A device for positioning a first object relative to a second object which includes a metal surface, where the first object has a robotic head and the second object is located by a position sensing system comprising: a sensor and a transponder; said sensor comprising a transmitter and receiver unit in the robotic head and said transponder (50) is located on the metal surface of said second object; said transponder operates at a frequency in the microwave range and is enabled to reradiate a signal received from said sensor, said transponder thereby operating to enable positioning of said robotic head relative to said second object, said transponder comprising a microstrip antenna element (20), (60), (70), a dielectric material plate (28) and a ground plane (21), said dielectric material plate having two sides; said ground plane (21) being of similar size as the microstrip antenna element and wherein the transponder is arranged to cooperate with said metal surface of said second object which thereby provides a reflector plane (22), located behind the transponder, to obtain an antenna radiating diagram that is directed perpendicular out from the transponder on the opposite side from said reflection plane; said transponder having a power source (40) and associated electronic elements, placed inside the perimeter of said microstrip antenna element (20), (60), (70) and on one side of the dielectric plate; said microstrip antenna element comprising at least one dipole antenna element of a folded type being arranged with a said ground plane that has a size providing a diametric extension of less than 1.7 times, and more than 0.6 times that of the effective size of the microstrip antenna element, whereby the reflection of the back lobe thereby created is reflected by said metal surface of the second object behind the transponder, said reflection of the back lobe from the metal surface being added to the direct signal from the microstrip antenna element to form a radiating diagram directed perpendicular to the dielectric material plate and the microstrip antenna element.

* * * * *

UNITED STATES PATENT AND TRADEMARK OFFICE
CERTIFICATE OF CORRECTION

PATENT NO.   :  5,392,049
DATED        :  February 21, 1995
INVENTOR(S)  :  STAFFAN GUNNARSSON It is certified that error appears in the above-identified patent and that said Letters Patent is hereby corrected as shown below:

On title page, item [22]

and items (86) and (87) are missing. Please correct item (22) to read:

--(22)  PCT filed: July 5, 1991--

Please add the following PCT information items (86) and (87):

--(86)  PCT No. PCT/SE91/00478
        Sec. 371 Date: January 21, 1993
        Sec. 102(e) Date: January 21, 1993

(87)  PCT Pub. No. WO92/01952
        PCT Pub. Date: February 6, 1992--

Signed and Sealed this

Twenty-fifth Day of April, 1995

*Attest:*

BRUCE LEHMAN

*Attesting Officer*         *Commissioner of Patents and Trademarks*